Oct. 28, 1969  R. R. SMITH, JR  3,475,249
METHOD FOR JOINING MULTIPLE LAYERS OF SHEET MATERIAL
Filed Feb. 28, 1966  3 Sheets-Sheet 1
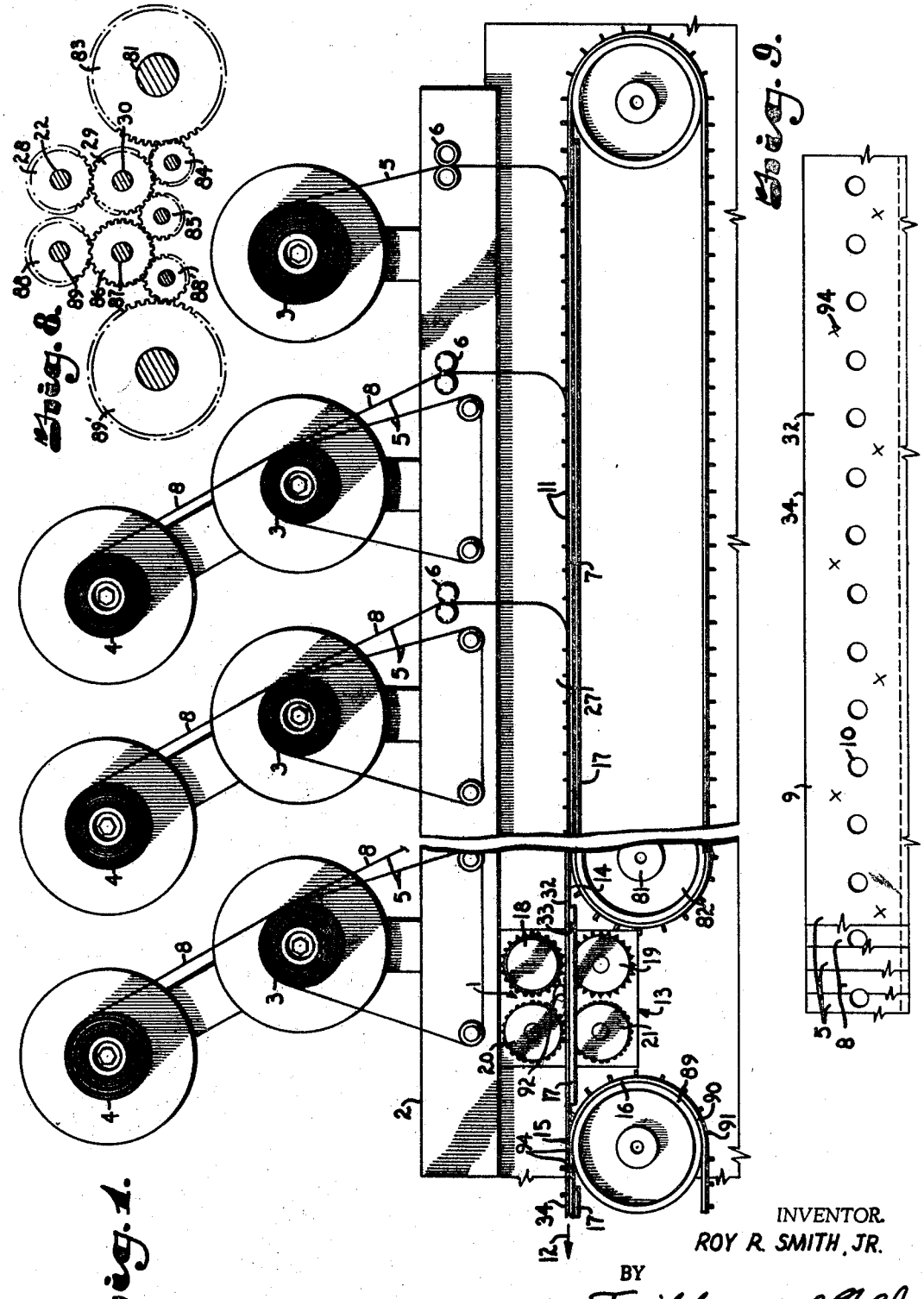
INVENTOR.
ROY R. SMITH, JR.
BY
Fishburn and Gold
ATTORNEYS

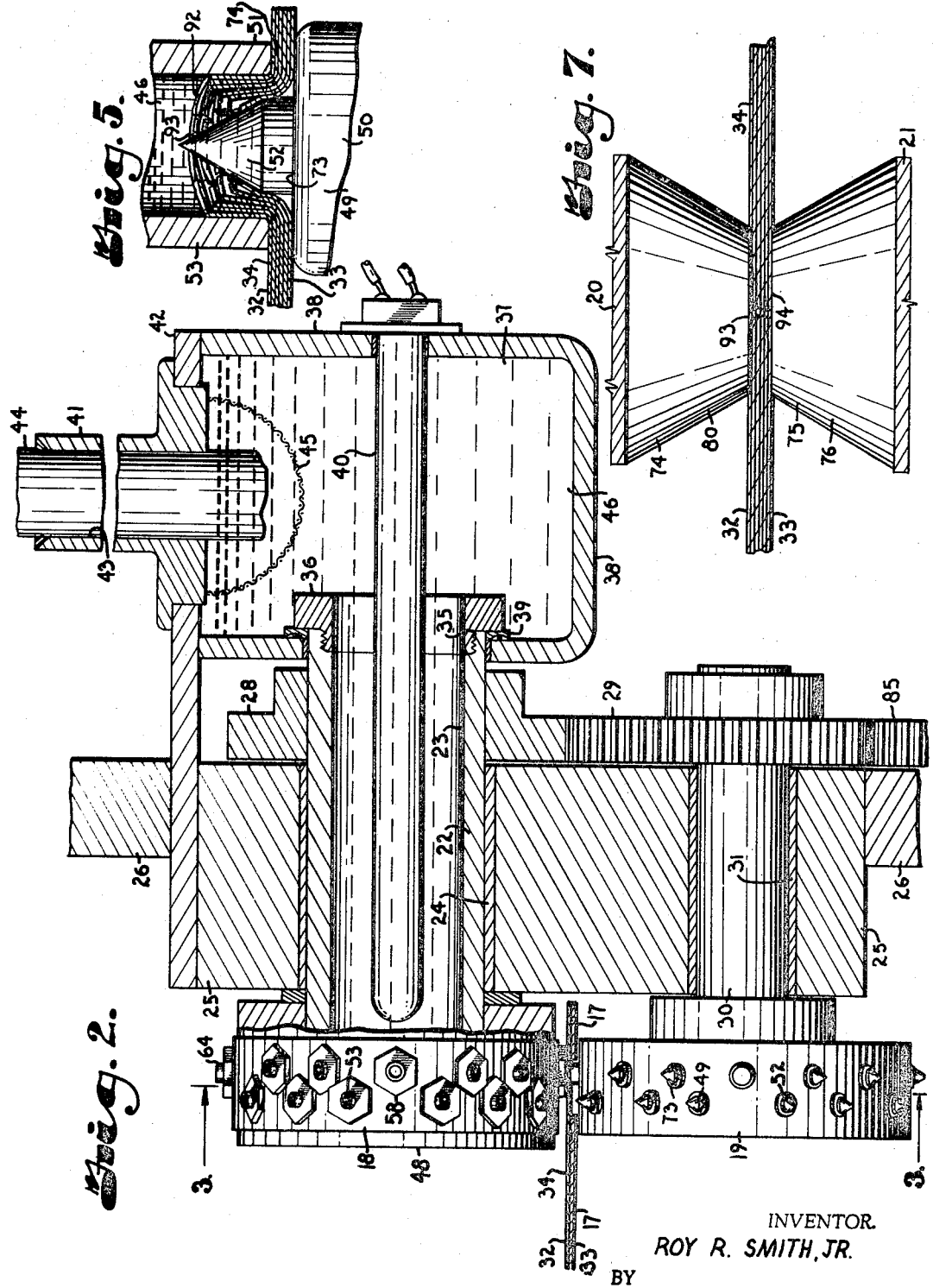

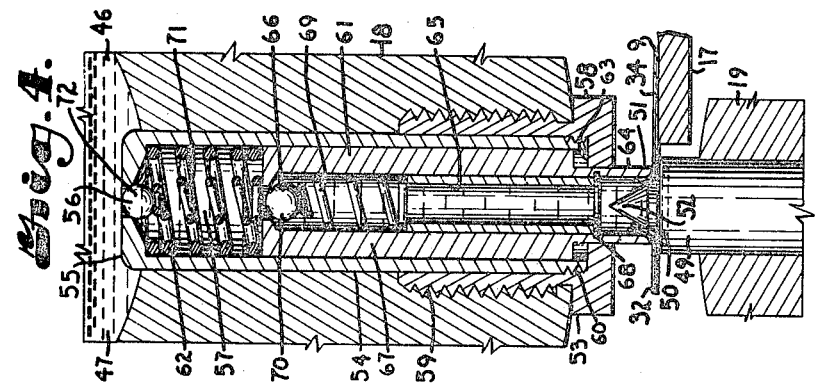
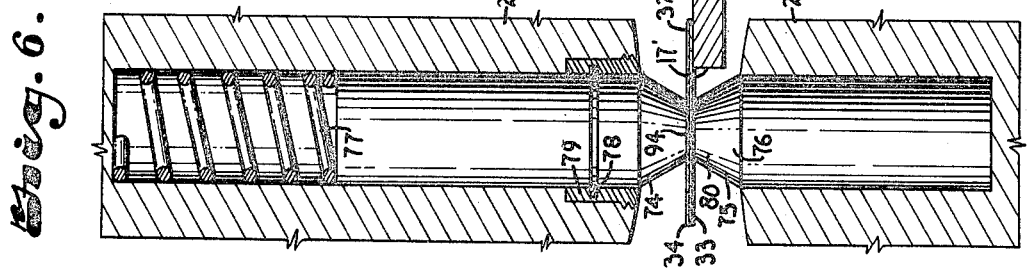
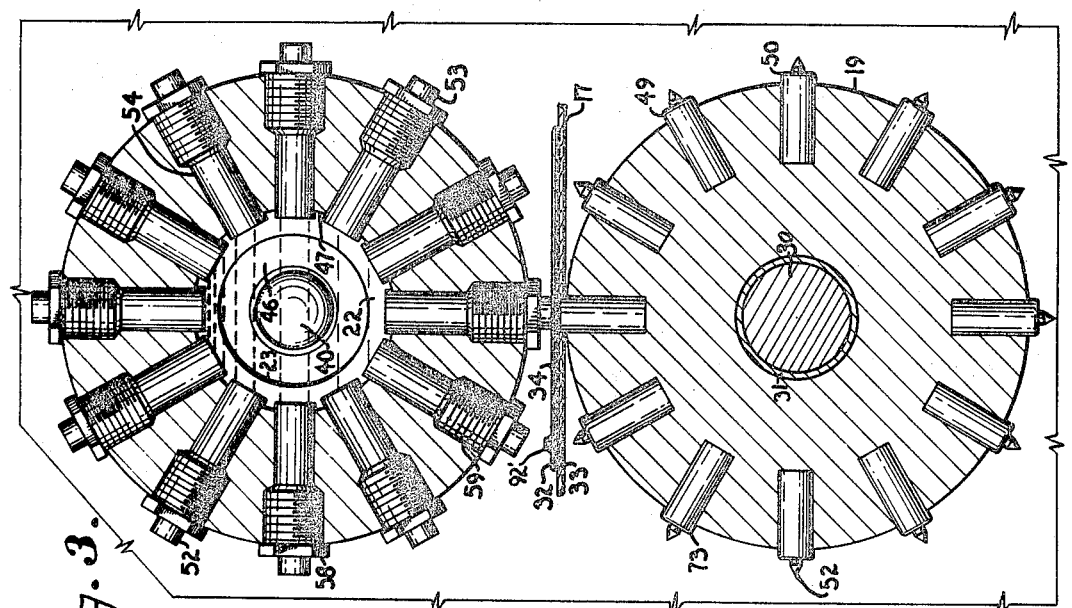
INVENTOR.
ROY R. SMITH, JR.
BY
Fishburn and Gold
ATTORNEYS

United States Patent Office 3,475,249
Patented Oct. 28, 1969

3,475,249
METHOD FOR JOINING MULTIPLE LAYERS OF SHEET MATERIAL
Roy R. Smith, Jr., Kansas City, Kans., assignor to Smith R.P.M. Corporation, Kansas City, Mo., a corporation of Missouri
Filed Feb. 28, 1966, Ser. No. 538,135
Int. Cl. B32b 29/00, 31/18; B26f 1/10
U.S. Cl. 156—253                                3 Claims

ABSTRACT OF THE DISCLOSURE

Overlying webs of paper are joined together while moving by urging wheel mounted punching members through the layers, thereby exposing interior edges surrounding the punching axis, applying adhesive to the exposed edges and urging any protruding edges back into the plane of the webs following the adhesive application.

---

This invention relates to improvements in sheet material joining apparatus and methods and more particularly, to the use of adhesives for this purpose.

The principal objects of the present invention are: to provide an improved method and apparatus for joining layers of sheet material together in selected locations with adhesive; to provide such an apparatus and method which permits several layers of sheet material to be joined in a single operation; to provide such an apparatus and method which is suitable, among other uses, for joining collated paper webs in the production of multiple page carbon paper interleaved business forms and the like; to provide such an apparatus and method which does not require the application of adhesive to separated layers or sheets; to provide such a joining method and apparatus which requires only a minimum quantity of adhesive; to provide an improved joining method and apparatus which does not leave protrusions projecting from the surface of the joined sheets and which is adaptable for use with either cold or hot melt adhesives; to provide such an apparatus and method for use on business form paper web collators which does not require individual adhesive applicators at each collating station and wherein skidding between sheets or layers of the forms is effectively eliminated; and to provide such an apparatus and method which presents a minimum of maintenance requirements, is relatively inexpensive in construction and use, automatically compensates in adhesive metering for the number of sheets or layers to be joined, permits adhesive bridging over carbon wax layers and the like; produces a comparatively flexible collated product, and is otherwise well suited for its intended purpose.

Other objects and advantages of this invention will become apparent from the following description taken in connection with the accompanying drawings wherein are set forth by way of illustration and example certain embodiments of this invention.

FIG. 1 is a partially schematic front elevation of a business form paper web collating machine with a preferred form of apparatus embodying this invention operably mounted thereon.

FIG. 2 is a cross-sectional view through the apparatus in side elevation particularly illustrating a melted adhesive chamber and cooperating discs supporting web punch and socket members.

FIG. 3 is a cross-sectional view taken on the line 3—3, FIG. 2, illustrating radially positioned punch and socket members for applying adhesive on and between collated webs.

FIG. 4 is a vertical cross-sectional view through the joining apparatus on an enlarged scale showing a set of cooperating punch and socket members with the collated web therebetween.

FIG. 5 is a fragmentary cross-sectional view on a further enlarged scale showing details of a punch member received in a socket member together with exposed web edges.

FIG. 6 is a vertical cross-sectional view on an enlarged scale illustrating a cooperating pair of anvil members flattening a protrusion on the collated webs therebetween.

FIG. 7 is a fragmentary cross-sectional view on a further enlarged scale showing details of the anvil members flattening the protrusion.

FIG. 8 is a fragmentary partially schematic view showing cooperation between mating gears for driving the punch, socket and anvil discs synchronously with the collating belt drive.

FIG. 9 is a fragmentary plan view on an enlarged scale illustrating the appearance of the collated webs after joining and protrusion flattening.

Referring to the drawings in more detail:

The reference numeral 1 generally indicates a preferred example of joining apparatus embodying this invention. The apparatus 1 is shown in conjunction with a web collating machine 2 of a typical type having a plurality of web feed rolls 3 formed of printed paper, which may be of different weights, and carbon paper feed rolls 4. The rolls 4 release respective paper webs 5 through feeder rollers 6 and downwardly onto a horizontally traveling belt 7. The rolls 4 feed carbon paper webs 8 downwardly in overlapping relation against selected paper webs 5 and through selected feed rollers 6 downwardly onto the belt 7. The respective webs, in this example, are perforated along one longitudinal edge 9 thereof forming spaced apart circular openings 10 through which are received spaced apart pins 11 projecting from the belt 7. Thus, as the belt 7 is driven in the direction indicated by the arrow 12, the webs 5 and 8 are successively collated or brought together continuously in register on the belt 7. The collated unjoined webs are secured or joined together along the edge 9 before leaving the collating machine so as to maintain proper register of the printed material on the various webs 5 during the subsequent operations (not shown) of cutting, folding or rerolling.

The apparatus 1 is shown mounted on the collating machine 2 at a station 13 whereat all the webs are collated and maintained in register, although out of contact with the pins 11 on the belt 7. In this example, the register is maintained because of the close proximity between the pins 11 which are withdrawn from the webs at 14 and the insertion of pins 15 on a belt 16 immediately downstream from the apparatus 1. The webs are supported on elongated spaced apart runners or strips 17 forming slots 17' therebetween and extending longitudinally of the collating apparatus for accommodating the pins 11 and 15 and web operating portions of the apparatus 1 described below.

The apparatus 1 comprises a first pair of discs 18 and 19 and a second pair of discs 20 and 21. The disc 18 is mounted on a shaft 22 which is hollow forming an axial passageway 23 therein. The shaft 22 rotates in a suitable bearing 24 supported in a wall 25 which is, in turn, rigidly secured by means of a suitable mounting bracket 26 to the frame 27 of the collating machine 2. A gear 28 is fixed to the shaft 22 rearwardly of the wall 25 and engages with a similar gear 29 mounted on a shaft 30. The shaft 30 rotates in a bearing 31 supported in the wall 25 and the disc 19 is fixed to the shaft 30 in vertical alignment with the disc 18. The discs 18 and 19 are respectively positioned adjacent opposite surfaces or faces 32 and 33 of the collated webs 34 at the station 13, the edge 9 being positioned tangentially therebetween.

The shaft 22 receives at the rear end 35 thereof a collar 36 projecting into a chamber 37 formed by chamber walls 38. The passageway 23 formed in the shaft 22 thereby communicates at the rear thereof with the chamber 27. A suitable running seal 39 permits the shaft 22 to rotate while a liquid seal is maintained between the shaft and the receiving chamber wall 38. A thermostatically controlled heater element 40 is mounted on one of the walls 38, extends transversely through the chamber 37 and into the passageway 23 so as to maintain the contents of the chamber and passageway at a desired temperature. A feeder member 41 is mounted on a top wall 42 positioned above the chamber 37. The feeder member 41 has a vertical tube portion forming a throat 43 communicating downwardly into the chamber 37. A suitable normally solid stick 44 of hot melt adhesive is placed in the throat 43 and extends downwardly into the chamber 37 where it adds fluid to the contents of the chamber 37 as the adhesive is ejected as noted below. A suitable screen 45 is mounted within the chamber 37 to prevent unwanted solid foreign matter from passing into the passageway 23 along with melted adhesive 46. The disc 18 includes a central chamber 47 communicating with the passageway 23 on one side of the disc and sealed at the other side with a cap 48. The melted adhesive 46 transfers sufficient heat from the heater element 40 to the disc 18 so that the adhesive contained within the chamber 47 and other portions of the disc in the liquid state.

A plurality of punch members 49 are mounted in circumferentially spaced apart radial relation and, in this example, also axially staggered relation in the disc 19. The punch members 49 each comprise a base portion 50 received in radial bores 51 and conical tip portions 52 which extend a measured distance radially outwardly of the discs 19 and beyond the respective base portions 50. Socket members 53 are mounted in circumferentially spaced apart radial relation in the disc 18 in positions respectively corresponding to the punch members 49. The socket members 53 each comprise a tube portion 54 having an integral end cap 55 closing one end thereof except for a central valve opening 56. The valve openings 56 communicate with the chamber 47 so as to selectively permit melted adhesive 46 to enter into the interiors 57 of the tube portions 54. Collar nuts 58 are threadedly engaged in partially threaded receiving bores 59 extending radially between the periphery of the disc 18 and the chamber 47. The nuts 58 also have internal threads 60 which engage matching external threads carried by the tube portions 54 on the end opposite the cap 55.

A plunger 61 is slidably received within each tube portion 54 and is longitudinally reciprocal radially of the disc 18. Helical compression springs 62 are contained within the interiors 57 of the tube portions 54 and bear against the respective end cap 55 and plunger 61 so as to normally maintain the plunger resiliently bearing against the nut 58 at 63. The plungers 61 include an elongated central collar or socket portion 64 in the shape of a tube which slidably extends through and beyond the nut 58 and radially outwardly of the disc 18. The socket portion 64 is adapted to receive a tip portion 52 therein and communicates with a longitudinal interior passageway 65 formed in the plunger 61. The passageway 65 terminates at the end opposite the socket portion 64 in a valve opening 66 providing selective communication between the interior passageway 65 and the tube interior 57. A retainer sleeve 67 is received in the interior passageway 65 and held by means of a suitable lock ring 68. The sleeve 67 retains a helical compression spring 69 in a compressed condition normally urging a ball valve 70 in sealing position against the valve opening 66. A helical compression retaining spring 71 bears at one end thereof against the valve end of the plunger 61 and at the other end thereof against a ball valve 72 which normally closes the valve opening 56.

Thus, when a plunger 61 is urged radially inwardly with respect to the respective tube portion 54, melted adhesive 46 contained in the interior 57 cannot escape through the valve opening 56 and thus forces the ball valve 70 open through hydraulic pressure causing a measure of adhesive 46 to flow into the passageway 65 from which it is forced into the socket portion 64. When the plunger 61 is permitted to move radially outwardly under the force exerted by the spring 62, the adhesive in the passageway 65 cannot be pulled back into the interior 57 because of the closure of the ball valve 70, creating a partial vacuum condition in the interior 57 pulling the ball valve 72 to a slightly open position and drawing in melted adhesive from the disc central chamber 47. Thus, the plunger 61 constitutes a pump piston and each time the plunger is depressed radially inwardly, a small quantity of melted adhesive is pumped or ejected into the socket portion 64, the quantity being proportional to the distance the plunger is moved inwardly.

The base portion 50 of the respective punch members 49 forms a shoulder 73 adjacent the tip portion 52 which is of at least equal in diameter to the socket portion 64. When the tip portion 52 is received in the socket portion 64, the shoulder 73 abuts against the outer rim 74 of the socket portion 64 with collated webs 34 therebetween to cause the inward movement of the plunger 61.

The discs 20 and 21 are respectively located immediately down-stream respectively from the discs 18 and 19 and have anvil members 74 and 75 respectively mounted therein at positions corresponding respectively to the socket members 53 and punch members 49 of the discs 18 and 19. The anvil members 75 are rigidly positioned on the disc 21 and have tip portions 76 extending slightly radially outwardly of the periphery of the disc 21 tangentially coinciding with the web 34 as the disc is rotated. The anvil members 74 are mounted in longitudinally radally slidable relationship in the disc 20 and are normally urged slightly beyond a radius tangential with the collated webs 34 by a helical compression spring 77 but are limited in outward radial movement by retaining rings 78 bearing upon assembly nuts 79 threadedly engaged with the disc 20. The anvil members 74 have tip portions 80 corresponding in relative position and shape to the tip portions 76 and are adapted to cooperate to press a portion of the collated webs therebetween as discussed below.

The discs 18, 19, 20 and 21 are driven synchronously with each other and with the belt 7, in this example, by means of cooperating gears illustrated in FIG. 9 wherein the shaft 81 driving the belt sprocket 82 carries a gear 83 which engages an idler gear 84. The idler gear 84 engages the gear 29 which drives the disc shaft 30. The gear 29, as noted above, meshes with the gear 28 which drives the disc 18 through the shaft 22. An idler gear 85 meshes respectively with the gear 29 and a gear 86 mounted on a shaft 87 which drives the disc 21. The gear 86 meshes with a gear 88 mounted on a shaft 89 for driving the disc 20. An idler gear 88' meshes with the gear 86 and a gear 89' for driving a belt sprocket 90 engaging the belt 16. The respective pitch diameters of the gears are selected so that the rotation of the belt sprocket 82 drives the pins 11 at exactly the same speed as the tangential speed of the punch members 49, socket members 53, anvil members 74 and 75 and belt 16.

In operation, the respective webs 5 and 8 are brought together or collated in a known manner on the moving belt 7 with the pins 11 projecting through the openings 10 along the edge 9 of the respective webs. The pins 11 are withdrawn from the collated webs as the belt 7 follows around the belt sprocket 82 but the webs remain in register due to the short distance between the point of withdrawal of the pins 11 and the point of reinsertion of pins 91 on the belt 16, although the webs are supported between these points by the runners or strips 17. As the collated webs 34 pass between the peripheries of the rotating discs 18 and 19, the respective tip portions 52 are successively urged or punched through the webs and carry minute attached portions of the webs into the respective socket portions 64 forming spaced apart protrusions 92 from restricted web areas, the protrusions projecting from the plane of the webs. The protrusions 92 include web edges 93 of the various webs positioned adjacent the tip portion 52 within the socket portions 54, which web edges are somewhat spread apart and exposed to the melted adhesive 46 as best illustrated in FIG. 5. The mouth of the respective socket portion 64 is substantially sealed by the webs bearing against the shoulder 73 during adhesive application. The interefering relationship between tangential positions of the socket portion 54 and shoulder 73 with the webs therebetween produces a slight radially inward movement of the plunger 61 causing the melted adhesive 46 to be ejected under pressure against the exposed edges 93. As the collated webs 34 continue moving down-stream from the discs 18 and 19, the tip portions 52 are withdrawn leaving the protrusion 92 free to partially resiliently return toward the plane of the webs as shown at 92', FIG. 3. The resultant protrusions are then engaged between the respective sets of anvil members 74 and 75 urging same substantially completely back into the plane of the web, as best illustrated in FIG. 7, and also spreading and impregnating the adhesive more completely through the respective webs. Of particular note is the resultant bridging of the adhesive through and across the wax carbon webs, which are difficult to adhesively secure by conventional means. The adhesive is rapidly cooled by the tip portions 76 and 80 and is thereby set extremely rapidly for securely joining the respective webs in register for subsequent operations thereon without permitting relative movement or sliding therebetween. The melted adhesive is relatively viscous so the rotation of the disc 18 does not sling adhesive droplets from the normally open socket portions 64.

After the web passes between the discs 20 and 21, the protrusions appear as substantially flat closures 94 along the edge 9 as illustrated by FIG. 9. The axially staggered positioning of the punch and socket members 49 and 53 and the corresponding anvil members 74 and 75 position the closures 94 alternately on opposite sides of the web perforations or openings 10; however, it is to be understood that other relative positions of the closures 94 may be produced without departing from the scope of this invention. Further, it is intended that the apparatus and method embodying this invention may be used for joining multiple layers of paper or fibrous sheet material in individual sheets and other forms as well as webs. Thus, although one form of this invention has been illustrated and described, it is not to be limited thereto except insofar as such limitations are included in the following claims.

What I claim and desire to secure by Letters Patent is:
1. The method of joining a plurality of adjacent overlying paper webs comprising the steps of:
  (a) positioning a tearing punch member and a receiving hollow socket in alignment on opposite sides of said webs,
  (b) urging said punch member through said webs and into said socket thereby carrying into said socket and out of the plane of said webs exposed, torn edges of said webs surrounding said punch member,
  (c) applying adhesive through said socket to said exposed edges while said exposed edges and punch member are within said socket,
  (d) withdrawing said punch member and socket away from said webs, leaving said exposed edges wetted with adhesive and projecting out of the plane of said webs, and
  (e) pressing said wetted, exposed edges back into the plane of said webs.
2. The method as set forth in claim 1 wherein said adhesive is pumped into said socket for application to said torn edges.
3. The method as set forth in claim 1 wherein said urging step is carried out during continuous movement of said web along a path.

References Cited

UNITED STATES PATENTS

| | | | |
|---|---|---|---|
| 2,309,744 | 2/1943 | Kistler | 4—213 |
| 2,940,086 | 6/1960 | Wondrack | 4—239 |
| 2,156,804 | 5/1939 | Dorsch | 118—37 |
| 2,653,830 | 9/1953 | Newman | 117—4 |
| 2,395,077 | 2/1946 | Southwick | 156—252 |
| 2,930,632 | 3/1960 | Winders et al. | 156—253 |
| 3,136,649 | 6/1964 | Keahey | 118—37 |
| 3,303,083 | 2/1967 | Hedenstrom | 156—513 |
| 2,557,668 | 6/1951 | Lincoln | 156—513 |
| 3,350,249 | 10/1967 | Gregoire | 156—253 |

OTHER REFERENCES

Prater, IBM Technical Disclosure Bulletin, vol. No. 5, February 1959. Copy in 118–35.

DOUGLAS J. DRUMMOND, Primary Examiner

U.S. Cl. X.R.

117—4; 118—37; 270—53